(12) United States Patent
Banaji et al.

(10) Patent No.: US 12,603,823 B2
(45) Date of Patent: *Apr. 14, 2026

---

(54) HYBRID REQUEST ROUTING SYSTEM

(71) Applicant: ServiceNow, Inc., Santa Clara, CA (US)

(72) Inventors: Vani Banaji, Santa Clara, CA (US); Philip Casini, Santa Clara, CA (US); Scott Rhodes, Torrance, CA (US); Adam Wesley Moguel, Santa Clara, CA (US); Balaji Cuttackam, Hyderabad (IN); Chinmayee Nagaraju, Santa Clara, CA (US); Gaurav Goyal, Santa Clara, CA (US); Nidhi Srinivas, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/800,796

(22) Filed: Aug. 12, 2024

(65) Prior Publication Data

US 2024/0406082 A1     Dec. 5, 2024

Related U.S. Application Data

(63) Continuation of application No. 17/886,954, filed on Aug. 12, 2022, now Pat. No. 12,095,634.

(51) Int. Cl.
*H04L 41/5074* (2022.01)
(52) U.S. Cl.
CPC ................................ *H04L 41/5074* (2013.01)
(58) Field of Classification Search
None
See application file for complete search history.

(56) References Cited

U.S. PATENT DOCUMENTS

| | | | |
|---|---|---|---|
| 4,941,084 A | 7/1990 | Terada et al. | |
| 5,185,860 A | 2/1993 | Wu | |

(Continued)

FOREIGN PATENT DOCUMENTS

| | | | |
|---|---|---|---|
| EP | 0433979 A2 | 6/1991 | |
| EP | 1607824 A2 | 12/2005 | |

(Continued)

OTHER PUBLICATIONS

Office Action, U.S. Appl. No. 17/886,954, mailed Nov. 24, 2023.
Office Action, U.S. Appl. No. 17/886,954, mailed May 7, 2024.
U.S. Appl. No. 17/886,954, filed Aug. 12, 2022.

*Primary Examiner* — Mohamed Ibrahim
(74) *Attorney, Agent, or Firm* — McDonnell Boehnen Hulbert & Berghoff LLP

(57)     ABSTRACT

Persistent storage contains a state machine for a request routing process and a plurality of requests related to the request routing process. One or more processors are configured to apply the state machine through operations including: obtaining a request from the plurality of requests; providing, to a criticality detection application and to an intent detection application, a representation of the request, wherein the criticality detection application is configured to detect a criticality of the request, and wherein the intent detection application is configured to determine a semantic intent of the request; receiving, from the criticality detection application and the intent detection application, respective indications of a detected criticality of the request and a detected intent of the request; determining whether to route the request to a channel that is one of a live agent, a virtual agent, or a search-based application; and routing the request to the channel as determined.

20 Claims, 16 Drawing Sheets

(56)          References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller, II et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,328,260 B1 | 2/2008 | Muthiyan et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,069,737 B1 | 6/2015 | Kimotho et al. |
| 9,971,826 B1 | 5/2018 | Belmar |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,839,161 B2 | 11/2020 | Galitsky |
| 10,944,654 B2 | 3/2021 | Rimar et al. |
| 10,999,152 B1 | 5/2021 | Bar Oz et al. |
| 11,025,481 B1 | 6/2021 | Louca et al. |
| 11,089,115 B2 | 8/2021 | Garty et al. |
| 11,095,506 B1 | 8/2021 | Erblat et al. |
| 11,275,580 B2 | 3/2022 | Tamir et al. |
| 11,277,475 B1 | 3/2022 | Tal et al. |
| 11,281,442 B1 | 3/2022 | Tal et al. |
| 11,294,666 B1 | 4/2022 | Look |
| 11,296,922 B2 | 4/2022 | Leibkowiz et al. |
| 11,301,503 B2 | 4/2022 | Burli |
| 11,379,089 B2 | 7/2022 | Goswami et al. |
| 11,451,573 B2 | 9/2022 | Waplington |
| 11,470,107 B2 | 10/2022 | Waplington |
| 11,582,106 B2 | 2/2023 | Hameiri et al. |
| 11,616,690 B2 | 3/2023 | Feiguine et al. |
| 11,630,717 B2 | 4/2023 | Vutukuru et al. |
| 11,632,303 B2 | 4/2023 | Bitterfeld et al. |
| 11,640,369 B2 | 5/2023 | Bhogle et al. |
| 11,650,996 B1* | 5/2023 | Daianu .................. G06N 20/00 707/771 |
| 11,671,444 B2 | 6/2023 | Waplington |
| 11,695,641 B2 | 7/2023 | Bar Oz et al. |
| 11,734,150 B1 | 8/2023 | Casati |
| 11,778,093 B1* | 10/2023 | Driemeyer ........... H04L 51/046 379/218.01 |
| 11,829,233 B2 | 11/2023 | Watkins et al. |
| 11,831,729 B2 | 11/2023 | Herzog |
| 11,868,593 B2 | 1/2024 | Bradley et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0288053 A1 | 12/2006 | Holt et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2013/0283273 A1 | 10/2013 | Miyazaki |
| 2014/0122427 A1 | 5/2014 | Dary |
| 2017/0372231 A1* | 12/2017 | Ghatage .................. G06F 40/58 |
| 2018/0123940 A1 | 5/2018 | Rimar et al. |

(56) References Cited

U.S. PATENT DOCUMENTS

| | | | |
|---|---|---|---|
| 2019/0073257 A1 | 3/2019 | Dasgupta et al. | |
| 2019/0104398 A1 | 4/2019 | Owen et al. | |
| 2019/0129739 A1 | 5/2019 | Al Reza et al. | |
| 2019/0149515 A1 | 5/2019 | Sharma et al. | |
| 2019/0165957 A1 | 5/2019 | Abbott et al. | |
| 2019/0342162 A1 | 11/2019 | Bendre et al. | |
| 2020/0034462 A1 | 1/2020 | Narayanasamy et al. | |
| 2020/0050689 A1 | 2/2020 | Tal et al. | |
| 2020/0204443 A1 | 6/2020 | Bar Oz et al. | |
| 2020/0301678 A1 | 9/2020 | Burman et al. | |
| 2020/0304441 A1* | 9/2020 | Bradley | G06N 20/20 |
| 2021/0097168 A1 | 4/2021 | Patel et al. | |
| 2021/0194764 A1 | 6/2021 | Badyan et al. | |
| 2022/0129257 A1* | 4/2022 | Touati | G06F 16/2315 |
| 2022/0303352 A1 | 9/2022 | Herzog et al. | |
| 2022/0335438 A1 | 10/2022 | Lessin | |
| 2023/0117113 A1 | 4/2023 | Rubens | |
| 2023/0224527 A1 | 7/2023 | Colby | |
| 2023/0229542 A1 | 7/2023 | Watkins et al. | |

FOREIGN PATENT DOCUMENTS

| | | | |
|---|---|---|---|
| WO | 9934285 W | 7/1999 | |
| WO | 0052559 W | 9/2000 | |
| WO | 0179970 W | 10/2001 | |

* cited by examiner

700

| | |
|---|---|
| NUMBER | INC0000456 |
| ORIGINATOR | BOB SMITH |
| CREATED | 2022-02-07 9:56AM |
| SHORT DESCRIPTION | CAN'T CONNECT TO EMAIL |
| DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. |
| CATEGORY | EMAIL |
| ASSIGNED TO | ALICE JONES |
| STATUS | RESOLVED |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. |
| RESOLVED TIME | 2022-02-07 10:10AM |
| CLOSURE CODE | SOLVED (PERMANENTLY) |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? |
| LINK TO KNOWLEDGEBASE | ITKB/WIRELESS/CONFIGURATION.HTML |
| CONFIGURATION ITEM | ABC-123 |

EMAIL / SMS
NOTIFICATION

1060

USER CLICKS ON
AI SEARCH
RESULTS AT
WEB PORTAL

1062

USER CLICKS ON
FEEDBACK IN OR
VIA EMAIL / SMS

1064

CAN REQUEST
BE RESOLVED?

1066

NO

A

YES

MARK REQUEST
RESOLVED

1056

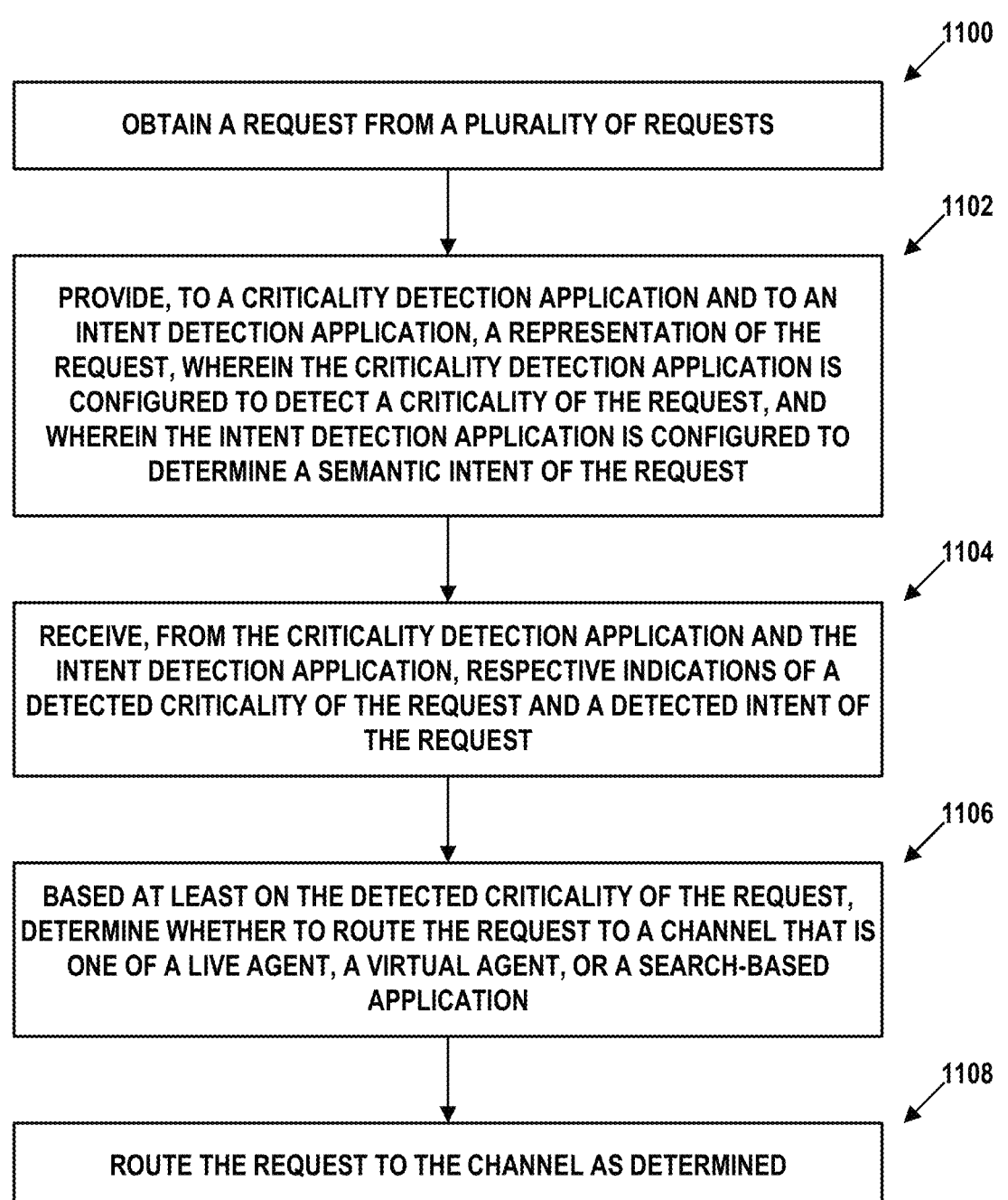

1100

OBTAIN A REQUEST FROM A PLURALITY OF REQUESTS

1102

PROVIDE, TO A CRITICALITY DETECTION APPLICATION AND TO AN INTENT DETECTION APPLICATION, A REPRESENTATION OF THE REQUEST, WHEREIN THE CRITICALITY DETECTION APPLICATION IS CONFIGURED TO DETECT A CRITICALITY OF THE REQUEST, AND WHEREIN THE INTENT DETECTION APPLICATION IS CONFIGURED TO DETERMINE A SEMANTIC INTENT OF THE REQUEST

1104

RECEIVE, FROM THE CRITICALITY DETECTION APPLICATION AND THE INTENT DETECTION APPLICATION, RESPECTIVE INDICATIONS OF A DETECTED CRITICALITY OF THE REQUEST AND A DETECTED INTENT OF THE REQUEST

1106

BASED AT LEAST ON THE DETECTED CRITICALITY OF THE REQUEST, DETERMINE WHETHER TO ROUTE THE REQUEST TO A CHANNEL THAT IS ONE OF A LIVE AGENT, A VIRTUAL AGENT, OR A SEARCH-BASED APPLICATION

1108

ROUTE THE REQUEST TO THE CHANNEL AS DETERMINED

FIG. 11

HYBRID REQUEST ROUTING SYSTEM

CROSS-REFERENCE TO RELATED APPLICATION

This application is a continuation of and claims priority to U.S. patent application Ser. No. 17/886,954, filed Aug. 12, 2022, which is hereby incorporated by reference in its entirety.

BACKGROUND

Remote network management platforms often support request routing systems in which requests from technology users are directed to one or more live agents and/or automated resolution channels (e.g., virtual agent chat, web portal search results, email, or text message). However, these routing systems create inefficiencies when they fail to route a request to the channel that is most likely to be able to resolve the request. When this happens, more computing resources on the platform (e.g., memory, processing, and network capacity) are consumed than is necessary. Additionally, the request is likely to take longer to resolve in these situations.

SUMMARY

In order to address these and possibly other drawbacks and limitations, the embodiments herein provide a flexible framework for routing, deflection, and escalation of requests. The embodiments can be based on three specific modules configured to detect the criticality of the request, the intent of the request, and the language of the request. Nonetheless, more or fewer modules could be used for request routing, including additional modules not otherwise described herein.

As an example, the criticality detection module could be applied to determine, based on the content of the request, whether the request is critical in nature (e.g., related to a major software outage, a sensitive personal issue, or needing to be resolved in a short period of time). Such requests might be routed directly to a live agent for resolution. Otherwise, the intent detection module might classify the intent of the request into one or more categories. Based on this classification, a channel that is deemed likely to be able to resolve the request is selected (e.g., virtual agent, web portal, email, text message).

In addition, the language detection module may be used to determine the language used in the request (e.g., English, French, Spanish), and route the request to a live agent or channel that supports the language. Moreover, some requests may be from users that prefer or only have access to certain channels (e.g., voice call, email, and/or text message only). Their requests may be routed so that resolution occurs by way of one or more of these particular channels.

Accordingly, a first example embodiment may involve persistent storage containing a state machine for a request routing process and a plurality of requests related to the request routing process; and one or more processors configured to apply the state machine through operations including: obtaining a request from the plurality of requests; providing, to a criticality detection application and to an intent detection application, a representation of the request, wherein the criticality detection application is configured to detect a criticality of the request, and wherein the intent detection application is configured to determine a semantic intent of the request; receiving, from the criticality detection application and the intent detection application, respective indications of a detected criticality of the request and a detected intent of the request; based at least on the detected criticality of the request, determining whether to route the request to a channel that is one of a live agent, a virtual agent, or a search-based application; and routing the request to the channel as determined.

A second example embodiment may involve obtaining, by a computing system, a request from a plurality of requests; providing, by the computing system, to a criticality detection application and to an intent detection application, a representation of the request, wherein the criticality detection application is configured to detect a criticality of the request, and wherein the intent detection application is configured to determine a semantic intent of the request; receiving, by the computing system, from the criticality detection application and the intent detection application, respective indications of a detected criticality of the request and a detected intent of the request; based at least on the detected criticality of the request, determining, by the computing system, whether to route the request to a channel that is one of a live agent, a virtual agent, or a search-based application; and routing, by the computing system, the request to the channel as determined.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts an incident record, in accordance with example embodiments.

FIG. 11 is a flow chart, in accordance with example embodiments.

DETAILED DESCRIPTION

Figure 1:
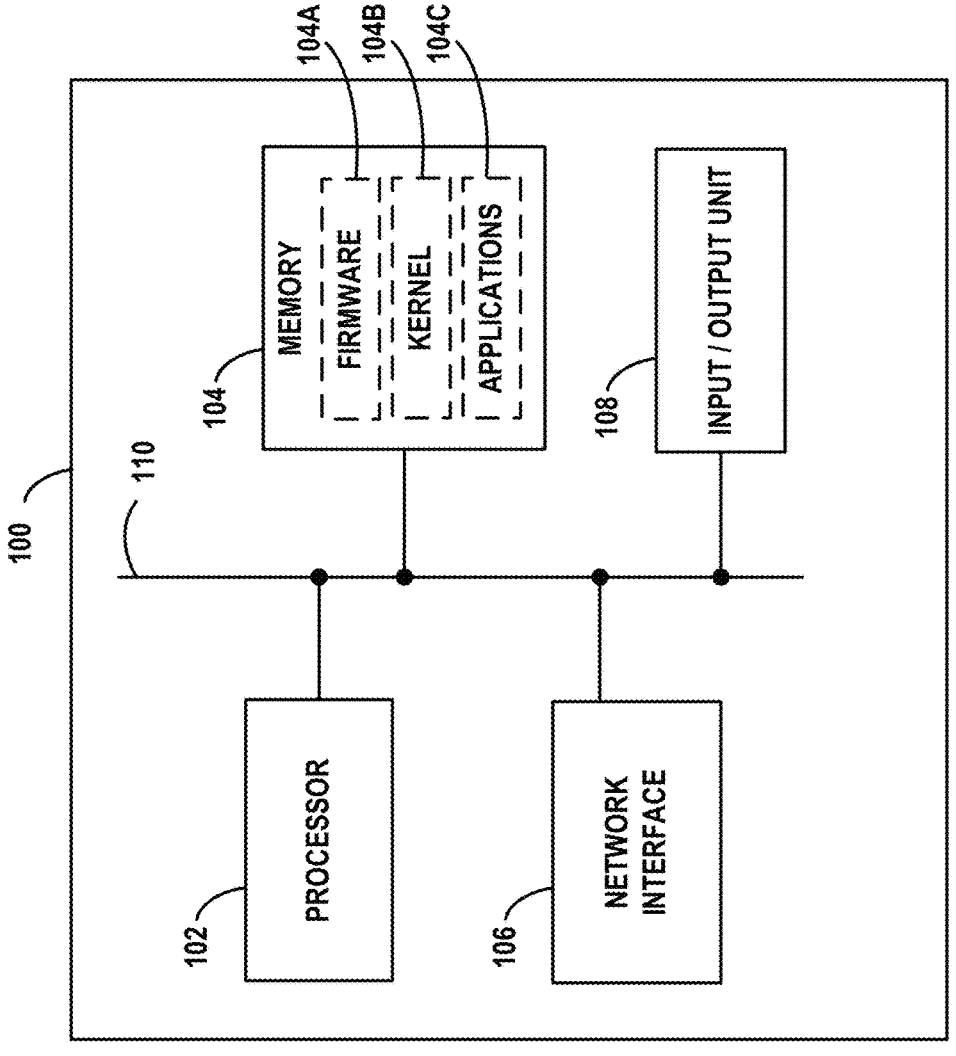
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
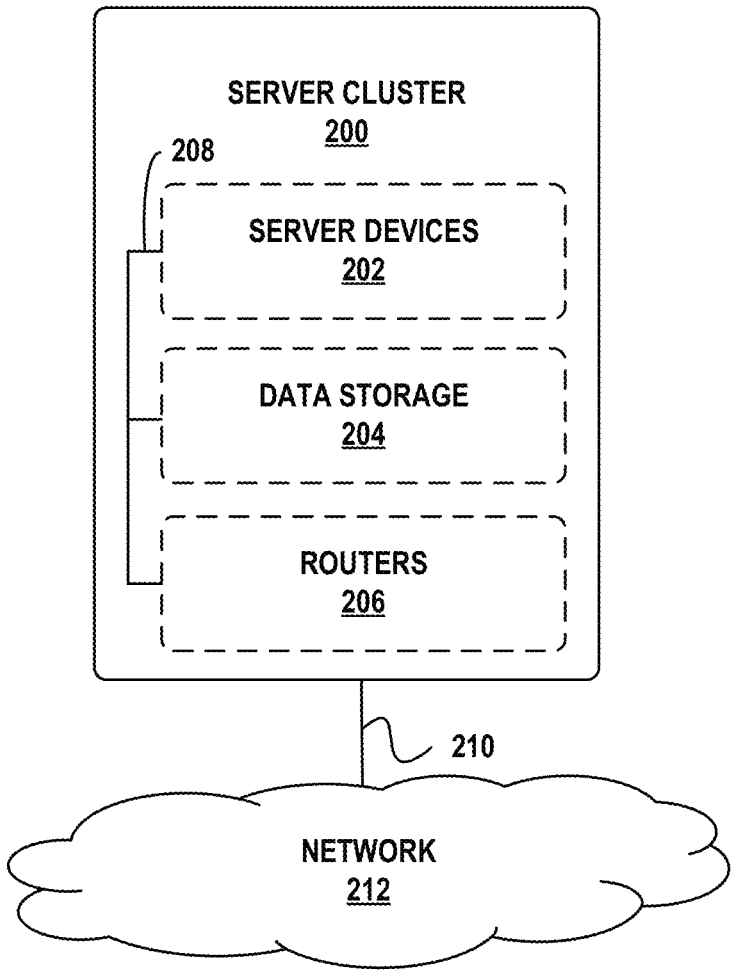
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
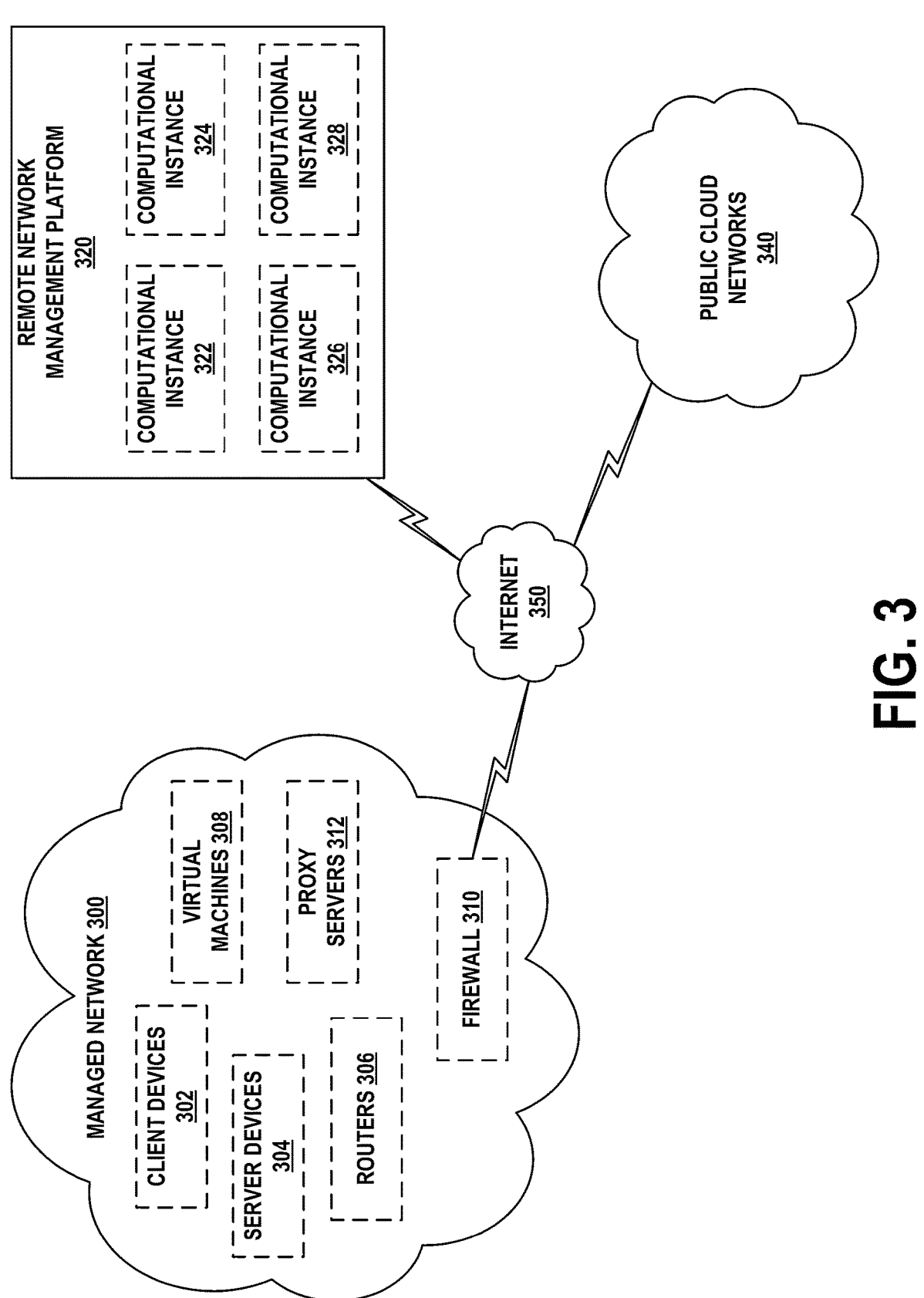
FIG. 3 depicts a remote network management architecture, in accordance with example embodiments.

FIG. 3 depicts a remote network management architecture, in accordance with example embodiments. This architecture includes three main components-managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion.

Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multitenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
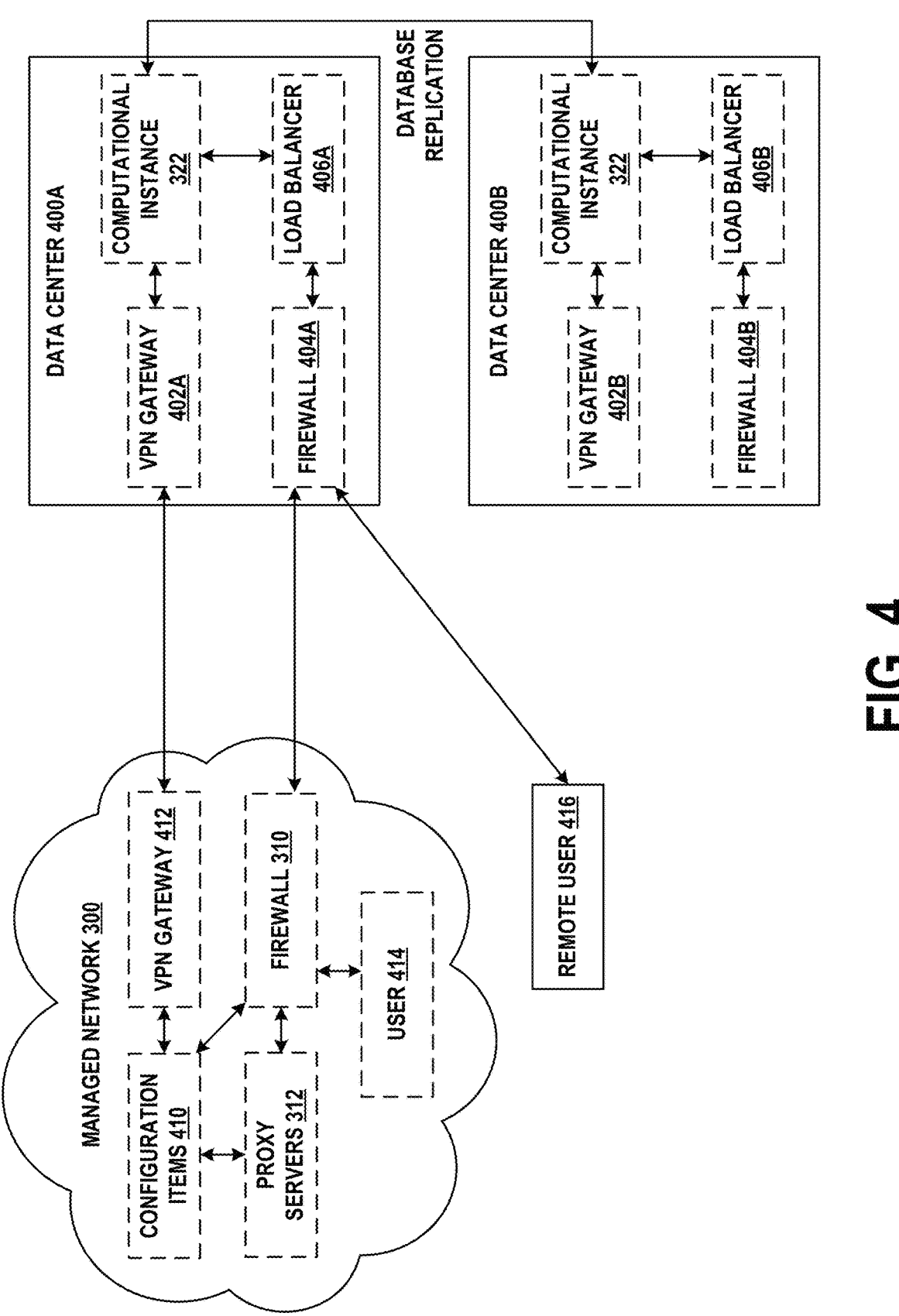
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
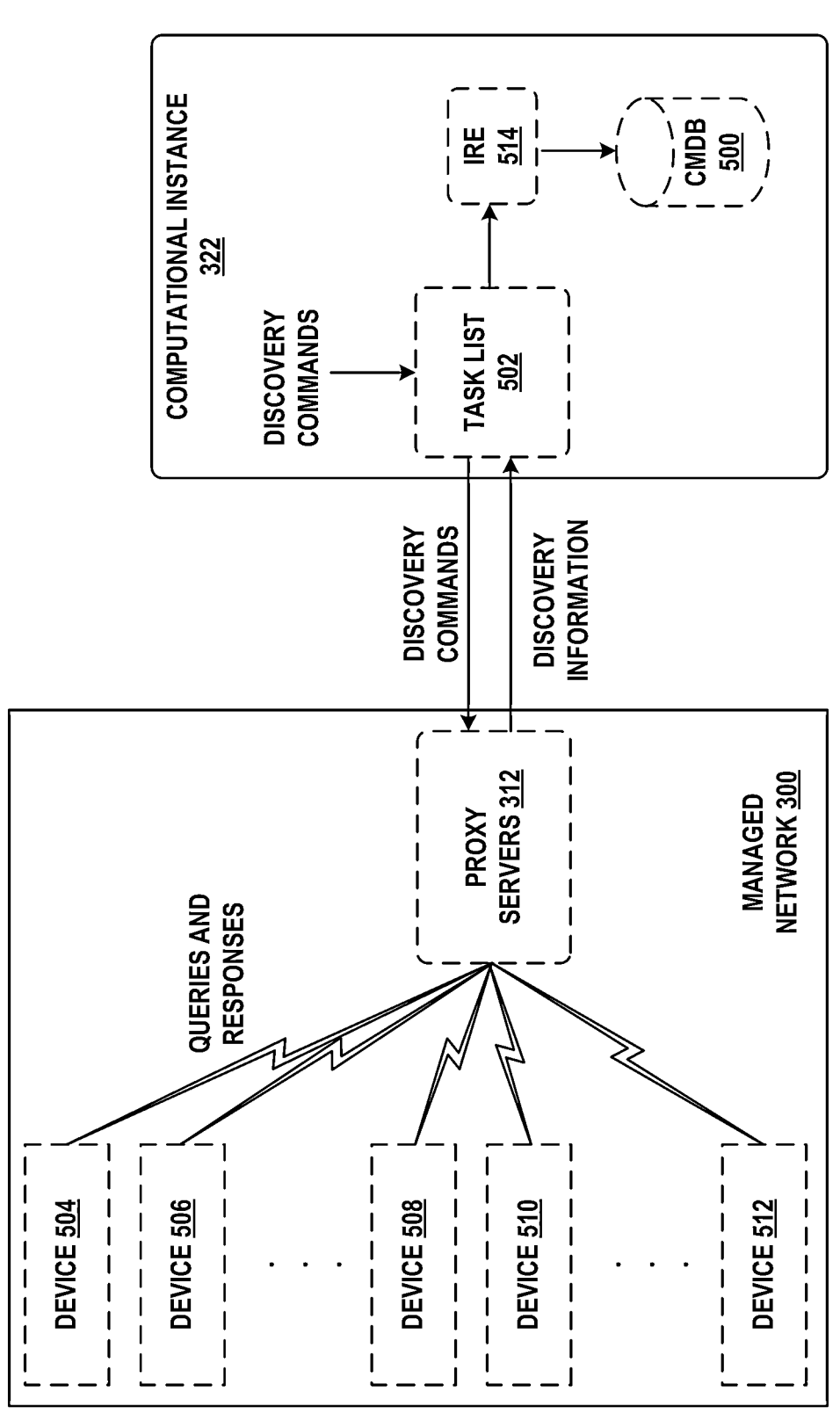
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es)

assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Request Routing Applications and Related Data

A computational instance of a remote network management platform (e.g., computational instance 322 of remote network management platform 320) may support a number of request routing applications. These might include incident routing, case routing, problem routing, or HR request routing applications. Each of these applications may apply a respective state machine to their requests. Thus a request may traverse the applicable state machine from initially being submitted to either being resolved or in some cases cancelled or closed without resolution.

Figure 6:
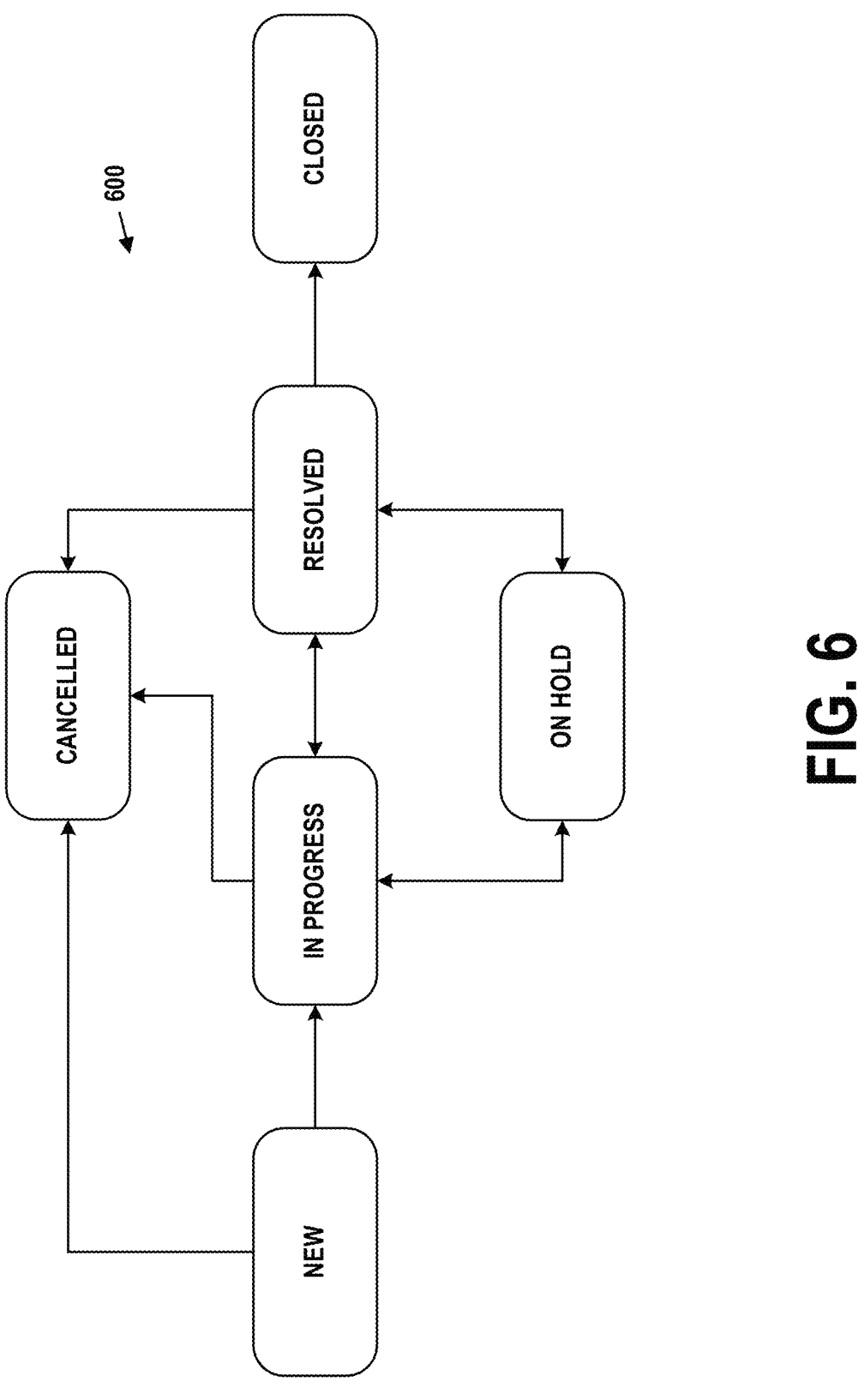
FIG. 6 depicts a state machine, in accordance with example embodiments.

FIG. 6 depicts an example state machine 600, in which the boxes represent discrete states and the arrows between these states represent transitions. This state machine represents that of an IT incident. Such an incident may be created by a technology user who has encountered a problem (e.g., an application not working properly on their laptop, a network service that is not reachable) or automatically generated when an outage is detected. Each incident may progress through this state machine from the new state to either the cancelled state or the closed state. Traditionally, the incident would be assigned to a live agent (i.e., a human) who is tasked with its resolution.

The states can be defined as follows. In the new state, the incident has been created but not yet investigated. In the in progress state, the incident has been assigned to an agent, and is being investigated or is scheduled for investigation. In the on hold state, the responsibility for the incident shifts temporarily from the assigned agent to another entity (e.g., the user or another agent) to provide further information, evidence, or a resolution. In the resolved state, the incident has been addressed by the agent. In the closed state, the incident has been confirmed to be satisfactorily resolved. In the cancelled state, the incident was triaged but found to be a duplicate incident, an unnecessary incident, not representing an actual problem, unsolvable, or otherwise reflecting a situation that does not need to be or cannot be resolved.

State machine 600 is just one possible incident routing state machine. Other such state machines involving more or few states and/or transitions may be possible. State machine 600 also serves as a simplified representation of more complicated state machines that go beyond just incident routing.

Further, each of the request routing applications (e.g., incident routing, case routing, problem routing, and/or HR request routing) may store requests in one or more tables of a database. For instance, the incident routing database may include a table that defines a number of fields for each incident. While incident reports may exist in various formats and contain various types of information, an example incident 700 is shown in FIG. 7. Incident 700 consists of a number of fields in the left column, at least some of which are associated with values in the right column.

These fields may identify a unique number of the incident, the originator of the incident, the time at which the incident was created, a short description of the problem experienced, a longer description of the problem, a categorization of the incident, the IT personnel to whom the incident is assigned, the status of the incident, how the incident was resolved (if applicable), the time at which the incident was resolved (if applicable), the closure code of the incident (if applicable), any additional notes added to the record, a link to an online article that may help users avoid having to address a similar issue in the future, and a configuration item believed to be related to the incident. Incidents may be arranged to have more, fewer, or different fields.

Notably, the fields of incident 700 are largely (or wholly) text-based. Thus, the values of certain fields can be processed to determine their semantic content. Such processing may employ use of one or more machine-learning language models and result in the classification of the incident in terms of its criticality, intent, and/or language. The next section provides a description of some possible machine-learning techniques that could be employed to achieve these goals.

VII. Similarity Determination

The embodiments herein may use or rely upon various types of similarity determination techniques and models applied to strings of text. This section describes some possible ways of determining textual similarities. Thus, any of these techniques, or other similarity determining techniques, can be incorporated into the embodiments herein in various arrangements.

In particular, similarity determination may employ one or more types of machine-learning language models. These models may utilize the classification and/or clustering techniques described below to facilitate similarity determination. But other machine-learning-based techniques may be used. Further, there can be overlap between the functionality of these techniques (e.g., clustering techniques can be used for classification or similarity operations). In many situations, machine-learning-based recommendations can be made from processing text in request data, and the embodiments below assume such textual records for purposes of illustration. Nonetheless, other types of information related to software applications may be used as the basis for developing and using machine-learning models Machine-learning techniques can include determining word and/or paragraph vectors from samples of text by artificial neural networks (ANNs), other deep learning algorithms, and/or sentiment analysis algorithms. These techniques are used to determine a similarity value between samples of text, to group multiple samples of text together according to topic or content, to partition a sample of text into discrete internally-related segments, to determine statistical associations between words, or to perform some other language processing task.

A word vector may be determined for each word present in a corpus of textual records such that words having similar meanings (or semantic content) are associated with word vectors that are near one other within a semantically encoded vector space. Such vectors may have dozens, hundreds, or more elements and thus may be in an m-space where m is a number of dimensions. These word vectors allow the underlying meanings of words to be compared or otherwise operated on by a computing device (e.g., by determining a distance, a cosine similarity, or some other measure of similarity between the word vectors). Accordingly, the use of word vectors may allow for a significant improvement over simpler word list or word matrix methods. These models also have the benefit of being adapted to the vocabulary, topics, and idiomatic word use common in its intended application.

Additionally or alternatively, the word vectors may be provided as input to an ANN, a support vector machine, a decision tree, or some other machine-learning algorithm in order to perform sentiment analysis, to classify or cluster samples of text, to determine a level of similarity between samples of text, or to perform some other language processing task.

Despite the usefulness of word vectors, the complete semantic meaning of a sentence or other passage (e.g., a phrase, several sentences, a paragraph, a text segment within a larger sample of text, or a document) cannot always be captured from the individual word vectors of a sentence (e.g., by applying vector algebra). Word vectors represent the semantic content of individual words and may be trained using short context windows. Thus, the semantic content of word order and any information outside the short context window is lost when operating based only on word vectors.

Similar to the methods above for learning word vectors, an ANN or other machine-learning models may be trained using a large number of paragraphs in a corpus to determine the contextual meaning of entire paragraphs, sentences, phrases, or other multi-word text samples as well as to determine the meaning of the individual words that make up the paragraphs in the corpus. For example, for each paragraph in a corpus, an ANN can be trained with fixed-length contexts generated from moving a sliding window over the paragraph. Thus, a given paragraph vector is shared across all training contexts created from its source paragraph, but not across training contexts created from other paragraphs.

Word vectors and paragraph vectors are two approaches for training an ANN model to represent the sematic meanings of words. Variants of these techniques, e.g., using continuous bag of words, skip-gram, paragraph vector-distributed memory, or paragraph vector-distributed bag of words, may also be used. Additionally or alternatively, other techniques, such as bidirectional encoder representations from transformers (BERT), may be used for example. These techniques may be combined with one another or with other techniques.

Figure 8A:
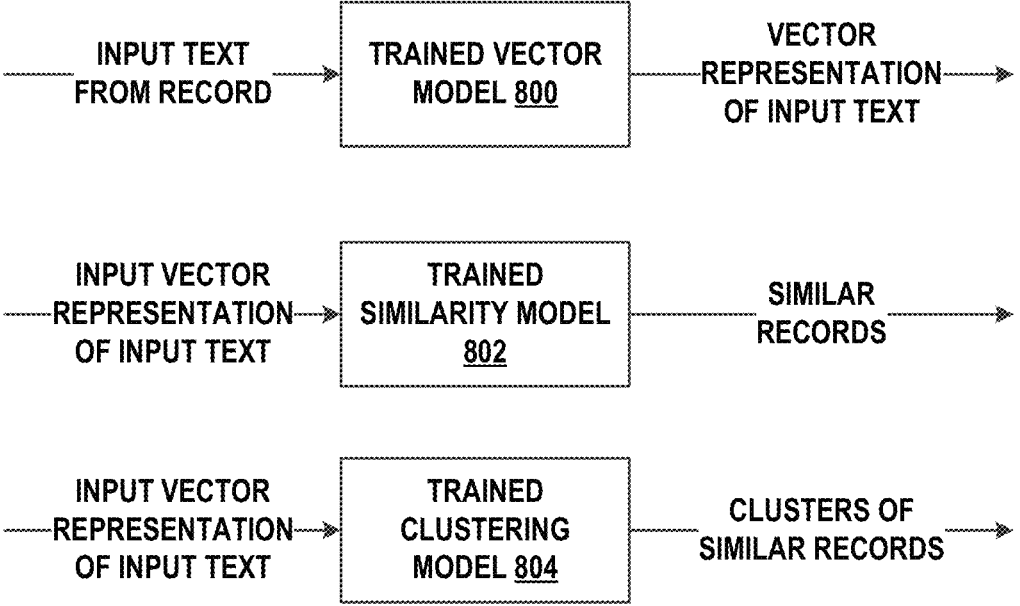
FIG. 8A depicts machine-learning language models, in accordance with example embodiments.

As an example relevant to the embodiments herein, vector models can be trained using word vector or paragraph vector techniques for example. To that point, trained vector model 800 in FIG. 8A, takes input text from a record (e.g., request data in database entries associated with a software application), and produces a vector representation of the input text. This vector representation encodes the sematic meaning of the input text by projecting the input text into m-dimensional space. Similar units of input text will likely have similarly-located vector representations in the m-dimensional space.

Accordingly, trained similarity model 802 takes an input vector representation of input text and produces zero or more similar records—i.e., records that contain similar text. As noted above, the degree of similarity between two units of text can be determined by calculating a similarity measurement between their respective vector representations. One such measurement may be based on cosine similarity, which is defined by the following equations:

$$\text{similarity}\ (\vec{A}, \vec{B}) = \frac{\vec{A} \cdot \vec{B}}{\|\vec{A}\|\|\vec{B}\|}$$

$$\text{where } \|\vec{A}\| = \sqrt{A_1^2 + A_2^2 + A_3^2 + \ldots + A_m^2}, \text{ and}$$

$$\|\vec{B}\| = \sqrt{B_1^2 + B_2^2 + B_3^2 + \ldots + B_m^2}$$

In these equations, vector A could represent one input vector and vector B could represent another input vector, each of which could be derived from different requests and/or from predetermined topics, for example. Vector A and vector B could both be of dimension m. The similarity calculation may have an output a number between −1.0 and +1.0, where the closer this result is to +1.0, the more similar vectors A and B are to each other.

Thus, the similar records produced by trained similarity model 802 may be those with vector representations for which the respective cosine similarities with the input vector representation of the record are above a threshold value (e.g., 0.2, 0.3, 0.5, or 0.8). Alternatively, the output of similar records may be a certain number of texts (or identifiers for the certain number of input texts) for which the respective cosine similarities with the input vector representation of the record are the most similar.

The similarity calculations described above may also be used to cluster similar records. Such clustering may be performed to provide a variety of benefits. For example, clustering may be applied to a set of records in order to identify patterns or groups within the set of records that have relevance to a particular semantic meaning or intent. Such groups may facilitate the identification and/or classification of records based on such meanings or intents.

Clustering may be performed in an unsupervised manner in order to generate clusters without the requirement of manually-labeled records, to identify previously unidentified clusters within the records, or to provide some other benefit. A variety of methods and/or machine-learning algorithms could be applied to identify clusters within a set of records and/or to assign records (e.g., newly received or generated records) to already-identified clusters. For example, decision trees, ANNs, k-means, support vector machines, independent component analysis, principal component analysis, or some other method could be trained based on a set of available records in order to generate a machine-learning model that classifies available records and/or records not present in the training set of available records.

For instance, clusters may be identified, for example, to include vector representations that are within a particular extent of similarity from one another, or not more than a particular Euclidian distance from a centroid in m-space. In these models, some outlying vector representations may remain un-clustered.

Once a machine-learning model has been determined, the machine-learning model can be applied to assign additional records to the identified clusters represented by the machine-learning model and/or to assign records to a set of residual records. The machine-learning model could include parameter values, neural network hyperparameters, cluster centroid locations in feature space, cluster boundary locations in feature space, threshold similarity values, or other information used, by the machine-learning model, to determine which cluster to assign a record and/or to determine that the record should not be assigned to a cluster (e.g., should be stored in a set of residual, unassigned records). Such information could define a region, within a feature space, that corresponds to each cluster. That is, the information in the machine-learning model could be such that the machine-learning model assigns a record to a particular cluster if the features of the record correspond to a location, within the feature space, that is inside the defined region for the particular cluster. The defined regions could be closed (being fully enclosed by a boundary) or open (having one or more boundaries but extending infinitely outward in one or more directions in the feature space).

Trained clustering model 804 depicts such an arrangement in general. Particularly, trained clustering model 804 takes an input vector representation of input text and identifies a cluster of similar records (if one exists). To the extent that clusters overlap in the model, more than one cluster can be identified. The cluster or clusters may be determined based on similarity calculations (e.g., cosine similarities) between the input vector representation of the input text and that of other records in the cluster or a centroid of the cluster, for example.

Figure 8B:
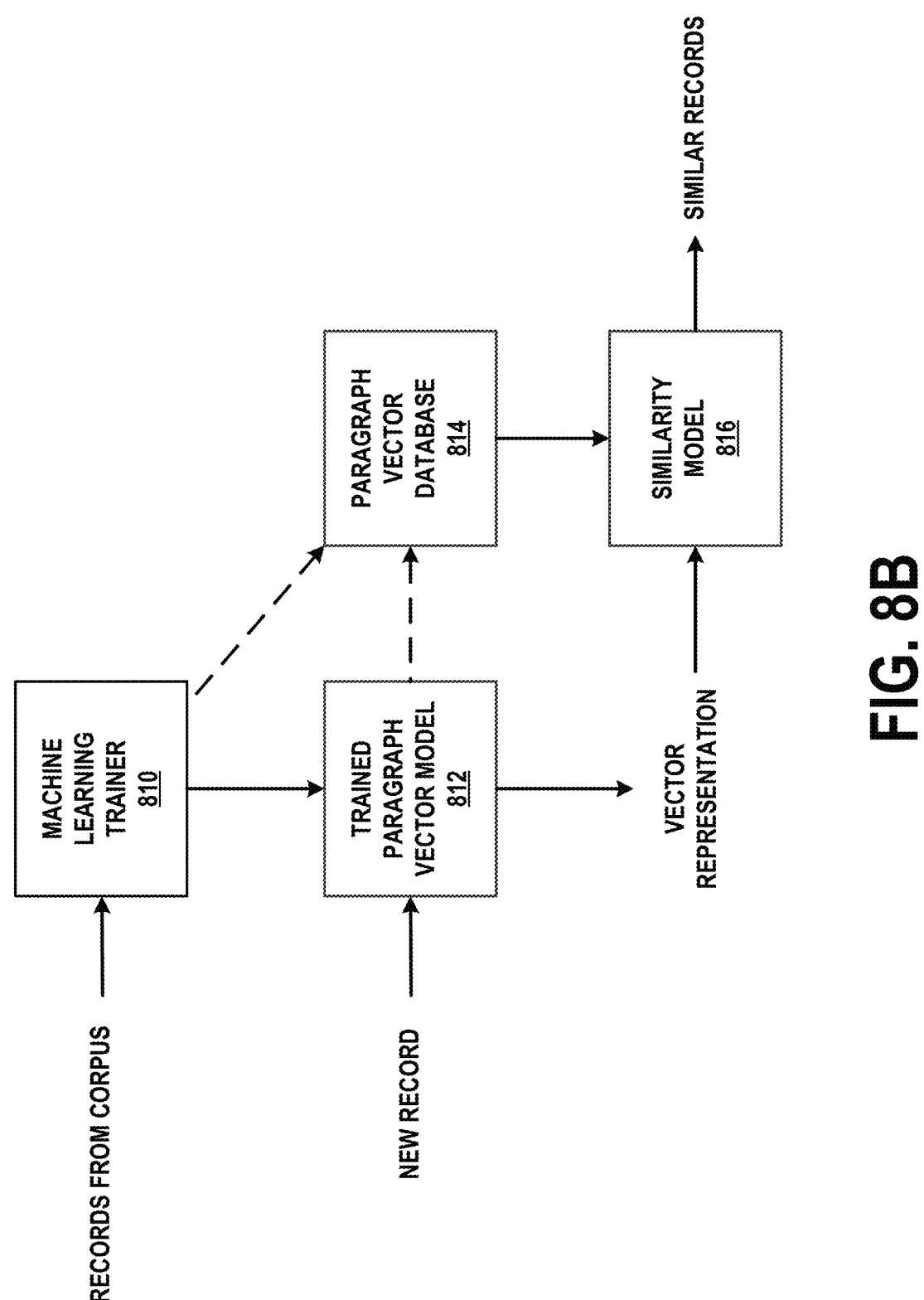
FIG. 8B depicts possible usage of machine-learning language models, in accordance with example embodiments.

FIG. 8B depicts an example of these models in practice. Machine-learning trainer 810 may include one or more machine-learning training techniques that takes text fields from a corpus of requests and/or database entries, and produces trained paragraph vector model 812. For example, some or all of the requests specified above for a request routing application may be used as input into machine-learning trainer 810. Any of the above paragraph vector generation techniques could be used. Thus, trained paragraph vector model 812 may produce vector representations of input records once it is trained. These vector representations may be stored in memory and/or provided as input to similarity model 816.

Machine-learning trainer 810 may also produce paragraph vector database 814 as part of the training process. Thus, paragraph vector database 814 may contain one vector representation per record in the corpus (e.g., if the corpus contains k records, there may be k vector representations, one for each record). In some embodiments, paragraph vector database 814 may be produced by providing records in the corpus to trained paragraph vector model 812 and storing their respective vector representations as paragraph vector database 814.

Similarity model 816 may take the vector representation from trained paragraph vector model 812 as input, retrieve one or more stored vector representations from paragraph vector database 814, and calculate similarity measures (e.g., cosine similarities) between the vector representation and one or more vector representations retrieved from paragraph vector database 814. These similarity measures may be used to identify records from the corpus that are similar to the record from which the vector representation was derived (e.g., having a calculated similarity value that is greater than a threshold). For example, if vector representation v1 derived from record r1 is determined to be similar to vector representation v2 derived from record r2, then it can be concluded that there is a semantic similarity between record r1 and record r2. Alternatively, certain intents or topics may be predefined in vector space and requests may be compared to these predefined vectors in order to classify the intent(s) and/or topic(s) of each request.

It should be noted that these inputs, outputs, and models are provided for purposes of example, and other inputs, outputs, and model architectures may be possible.

VIII. Request Routing and Resolution

At a high level, the embodiments herein relate to receiving a request into a request routing system, and then routing the request based on the criticality, intent, and/or language of the request. Other routing considerations include the preferred mode of communication of the individual who made the request or upon whose behalf the request was made.

In contrast to these embodiments, previous solutions were drawn to avoiding formal request creation when possible. Such solutions might route incoming IT support calls or messages, for example to a live agent or virtual agent based on the load on these agents or other factors. For instance, an incoming support message might initially be assigned to a virtual agent (using interactive voice response or a chatbot), and then transferred to a live agent if the virtual agent fails to resolve the underlying issue. After conferral with a live agent, a request (e.g., an incident) would be created if the live agent could not resolve this issue.

The embodiments herein provide improvements over these solutions by intelligently routing requests to a channel that is deemed to be likely (e.g., most likely) to be able to resolve the request. In this manner, computing resource usage can be reduced (e.g., use of a virtual agent can be skipped or otherwise avoided when appropriate), and resolution time can be improved. Also, since incidents contain a reasonable amount of textual data relating to the request, the routing decisions can be made more accurately by applying language models to this data. Doing so was not possible in prior systems that route requests before determining the semantic meaning of the requests.

Figure 9:
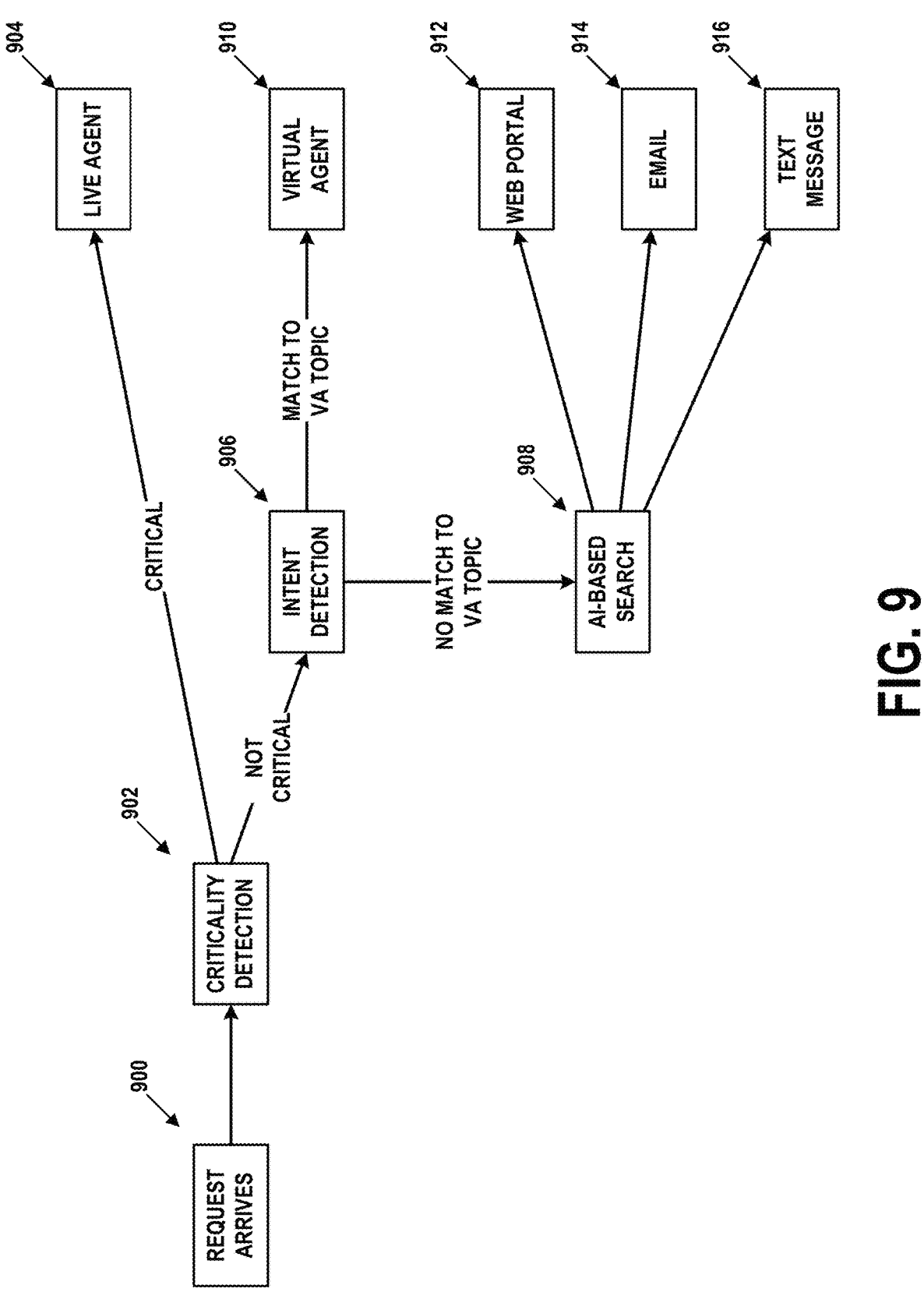
FIG. 9 depicts a request routing process, in accordance with example embodiments.

FIG. 9 provides an overview of the routing process, which will be described in more detail in subsequent figures. At block 900, a request arrives to the request routing system. The request may be, for example, an incident, case, problem, HR request, or some other form of request. The request may be represented by an entry in a database table (or more than one entry spanning multiple database tables) with a number of text-based fields characterizing the request.

At block 902, a criticality detection module may determine a criticality of the request. This determination may be made, for example, by applying a trained clustering and/or similarity language model to the request. Certain words, phrases, or other information in the request may make it more likely that the request is considered to be critical—i.e., HR requests of a personal or sensitive nature, requests that have a very short deadline for resolution, requests that involve major software or system outages, and so on. Block 902 may be considered to be a binary classifier, in that all incoming requests are determined to either be critical or not critical.

If a request is considered to be critical, the request may be routed to a live agent as shown by block 904. The live agent may be a human, and thus would be more capable of resolving personal, sensitive, urgent, or otherwise important requests than automated channels.

If a request is considered to be non-critical, the request may be routed to intent detection module 906. Intent detection module 906 may be configured to predict the semantic intent of the request based on the text thereof. Thus, intent detection module 906 may perform sentiment analysis or other techniques—in conjunction with a trained clustering or similarity language model-on this text. In some embodiments, there may be a number of pre-determined supported topics to which detected intents can be matched. An example listing of these topics could be: software access request, email issues, collaboration software issues, security tokens, VPN connectivity, hardware issues/slow computer, software install, reset password/account unlock, hardware request, manage distribution list, printer issues, repository access, and/or local admin access.

If the detected intent matches a supported topic (e.g., one of those in the listing above), the request may be routed to virtual agent 910. This virtual agent may be a chat interface implemented by way of a chat application (e.g., SLACK® or MICROSOFT TEAMS®), a web interface, or in some other fashion. The virtual agent may prompt the user for input (e.g., describing their request) and provide text-based answers. In some cases, images, audio, and/or video virtual agent chat may be supported. The virtual agent may be powered by a machine-learning model, an expert system, or some other mechanism. For example, each topic supported by the virtual agent may involve a dialogue tree through which the virtual agent navigates with the user.

If the detected intent does not match a supported topic, the request may be routed to AI-based search module 908. This module may employ one or more trained language models to look up possible resolutions for the request in a knowledge-base or some other corpus of data. Proposed resolutions may be provided to the user by way of one or more of the channels of web portal 912, email 914, or text message 916. The channel may be chosen based on a pre-determined user preference. For instance, some users (such as tradespeople who do not typically have access to a desktop or laptop computer during work hours) might prefer communication by way of text message, while others may prefer communication by way of a web portal. Such user preferences might be set by the user when they create the request or based on their account settings.

FIG. 9 is a simplified representation of the routing process. A more detailed version, including how a request can be handed off between channels, is shown in FIGS. 10A-10E.

Figure 10A:
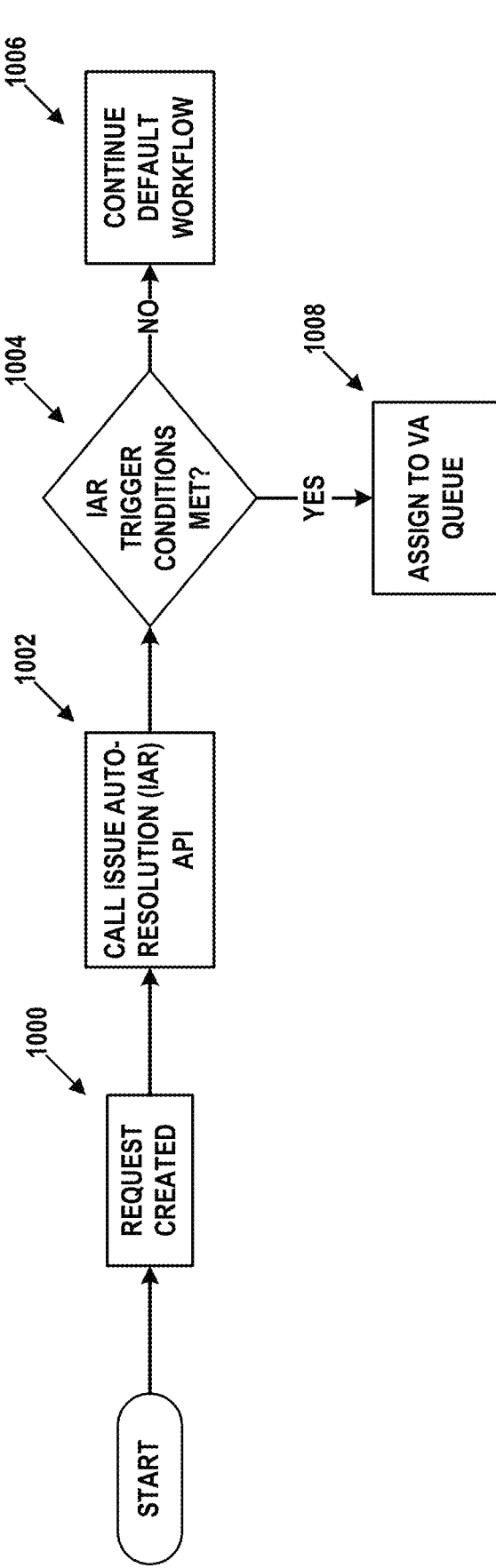
FIGS. 10A, 10B, 10C, 10D, and 10E depict a request routing process in more detail, in accordance with example embodiments.

FIG. 10A depicts possible initial stages of a request routing process. At block 1000, a request is created. The request may be created by way of a request routing application (e.g., an incident routing, case routing, problem routing, or HR request routing application). The request may be created by the user to whom the request applies or for this user by another user or an automated procedure.

At block 1002, a call is made to an issue auto-resolution (IAR) API. This call is made to determine whether IAR can be applied to the request. In some embodiments, IAR may be used for all requests, while in others only requests of a certain type (e.g., incident and HR requests but not cases or problems), relating to a certain user or class of user, or created at a certain time of day may be subject to IAR. The result of the call may be a Boolean indicator, a numeric value, or some other type of value.

At block 1004, it is determined whether IAR trigger conditions are met. These trigger conditions may be based on the result of the call made in block 1002. For instance, if block 1002 provides a Boolean indicator, IAR trigger conditions may be considered to be met if the indicator is "true" and not met if the indicator is "false".

If the IAR trigger conditions are not met, IAR will not be used for this request and control is passed to block 1006. This block indicates that the default routing workflow will be used for the request (e.g., first to a virtual agent and then to a live agent regardless of criticality, language, or intent). If the IAR trigger conditions are met, IAR will be used and control is passed to block 1008. This block indicates that the request is assigned to a virtual agent (VA) queue. As explained below, this is a temporary assignment and the request will be further processed in order to determine its routing—the assignment to the VA queue is mainly for purposes of holding the request.

Figure 10B:
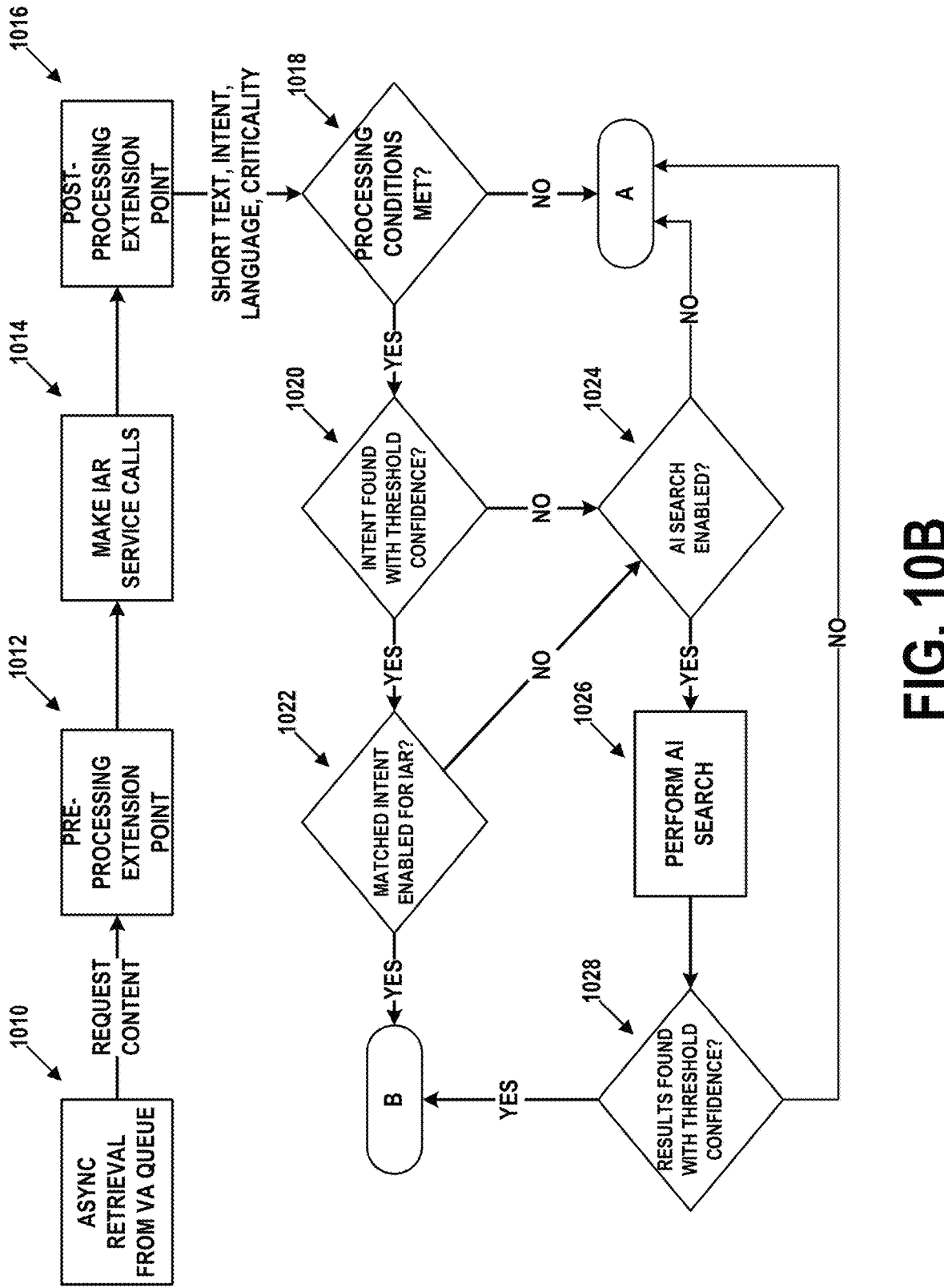

FIG. 10B depicts possible further stages of a request routing process. At block 1010, the request that was placed in the VA queue is asynchronously retrieved from this queue. This block passes the request content (e.g., text of its fields) to block 1012.

At block 1012, optional pre-processing may be applied to the request content by way of a pre-processing extension point. This extension point can be implemented as standardized or customized code, scripts, or functionality that can transform the request content in some fashion. For instance, information may be removed from the request content, added to the request content, or the request content may be changed by the extension point. Doing so allows request routing to be customized.

At block 1014, IAR service calls may be made with at least part of the request content (as modified, if applicable). In some embodiments, this may involve providing at least part of the request content to a criticality detection module, an intent detection module, and/or a language detection module. Each of these modules may be machine-learning language models that employ the similarity and/or clustering techniques described above among other possible techniques.

Output of these modules may be an indication of a detected criticality, intent, and/or language, respectively. Each of the detected criticality, intent, and/or language may be accompanied by a confidence score (e.g., a real number between 0.0 and 1.0 with higher values indicative of more confidence in the detection). In some embodiments, multiple candidate criticalities, intents, and/or languages may be returned by the modules, each with a respective confidence score.

The confidence scores may be used in various ways. Considering criticality as an example, a threshold confidence level (e.g., 0.3, 0.5, 0.7, etc.) may be established. If the confidence returned by the criticality detection module is above this threshold confidence level, then the request is considered to be critical. Considering language, the language detection module may return multiple possible languages, each with a confidence level (e.g., English 0.1, Spanish 0.6, Portuguese 0.8, French 0.4). The request may be considered to be in the language with the highest confidence, or the language with the highest confidence that is above a pre-determined threshold value. The intent detection module may operate in a similar fashion.

In some embodiments, only criticality detection and language detection may occur at block 1014. In these embodiments, intent detection may occur later in the routing process, e.g., in conjunction with block 1020.

At block 1016, optional post-processing may be applied to the request content and/or any detected criticality, intent, or language by way of a post-processing extension point. Like the pre-processing extension point of block 1012, this extension point can be implemented as standardized or customized code, scripts, or functionality that can transform the request content and/or detected features in some fashion. For instance, information may be removed from the request content and/or detected features, added to the request content and/or detected features, or the request content and/or detected features may be changed by the extension point. Doing so allows request routing to be further customized.

Regardless, either block 1014 or (if used) block 1016 may provide the detected criticality, intent, and language to block 1018. In some cases, a short textual summary of the request may also be provided to block 1018.

At block 1018, a determination may be made as to whether processing conditions are met. These conditions may be whether the system has rules or is otherwise configured to be able to handle requests with the short textual summary, criticality, intent, and/or language as detected. For instance, if the request is in French, the system might only support a subset of possible intents in French. If these conditions are met, the system may continue processing the request with control passing to block 1020. If these are not met, the system may instead stop processing the request with control passing to block A. Block A returns the request to the default workflow, and will be described in more detail below.

At block 1020, it may be determined whether an intent has been found with at least a threshold confidence. As noted, each detected intent may be accompanied by a confidence level (e.g., between 0.0 and 1.0). Block 1020 may determine whether an intent was detected that has a confidence above a pre-determined threshold (e.g., 0.5, 0.7, 0.8). If that is the case, then control passes to block 1022. If not, then control passes to block 1024. If more than one intent has a confidence above the threshold, then the intent with the highest confidence may be selected for further processing.

At block 1022, it may be determined whether the intent selected at block 1020 can be matched to a pre-determined IAR virtual agent topic. As noted above, there may be a list of such pre-determined topics. One or more detected intents could match each topic. As an example, for a topic of "email issues" there may be intents such as "spam filter needs update", "email won't refresh", and "mobile email configuration" that match this topic. Other possible matches may exist. If the detected intent matches a topic, then control passes to block B. Block B involves determining how to communicate with the user to whom the request pertains, and will be described in more detail below. If the detected intent does not match a topic, control passes to block 1024.

At block 1024, it may be determined whether AI search is enabled for the request, request type, user, or user class. If so, then control passes to block 1026. If not, then control passes to block A.

At block 1026, the AI search may be performed. Such an AI search may include using various techniques for searching databases of information (e.g., incident records, knowledgebases, web content, etc.) using machine-learning, expert systems, or hybrid approaches. For example, AI search may return links to a set of articles from a knowledgebase that are deemed semantically similar to textual information in the request.

At block 1028, it may be determined whether results of the AI search have been found and have at least a threshold level of confidence. As was the case with intents, each search result may be accompanied by a confidence score (e.g., a real number between 0.0 and 1.0 with higher values indicative of more confidence that the search result is relevant to the request). A pre-determined threshold (e.g., 0.5, 0.7, 0.8) may be established such that only search results with a confidence higher than this threshold are provided. If results are found with such a confidence, control passes to block B. If not, control passes to block A.

Figure 10C:
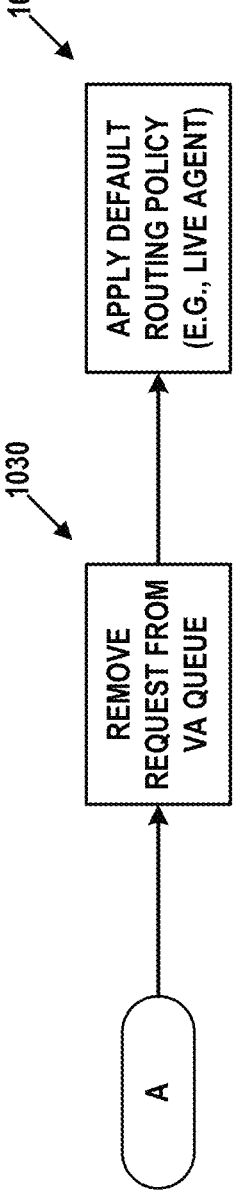

FIG. 10C depicts the request routing process for when the request is to be handled in accordance with the default routing policy—the outcome of control passing to block A. The default routing policy was described in the context of block 1006 (e.g., first to a virtual agent and then to a live agent regardless of criticality, language, or intent). But some other routing policy may be used (e.g., put all requests in the live agent queue).

Thus, at block 1030, the request is removed from the virtual agent queue. At block 1032, the default routing policy may be applied. As noted, this could place the request back into a virtual agent queue with a possible fallback to the live agent) or directly into a live agent queue. Other routing policies are possible.

Figure 10D:
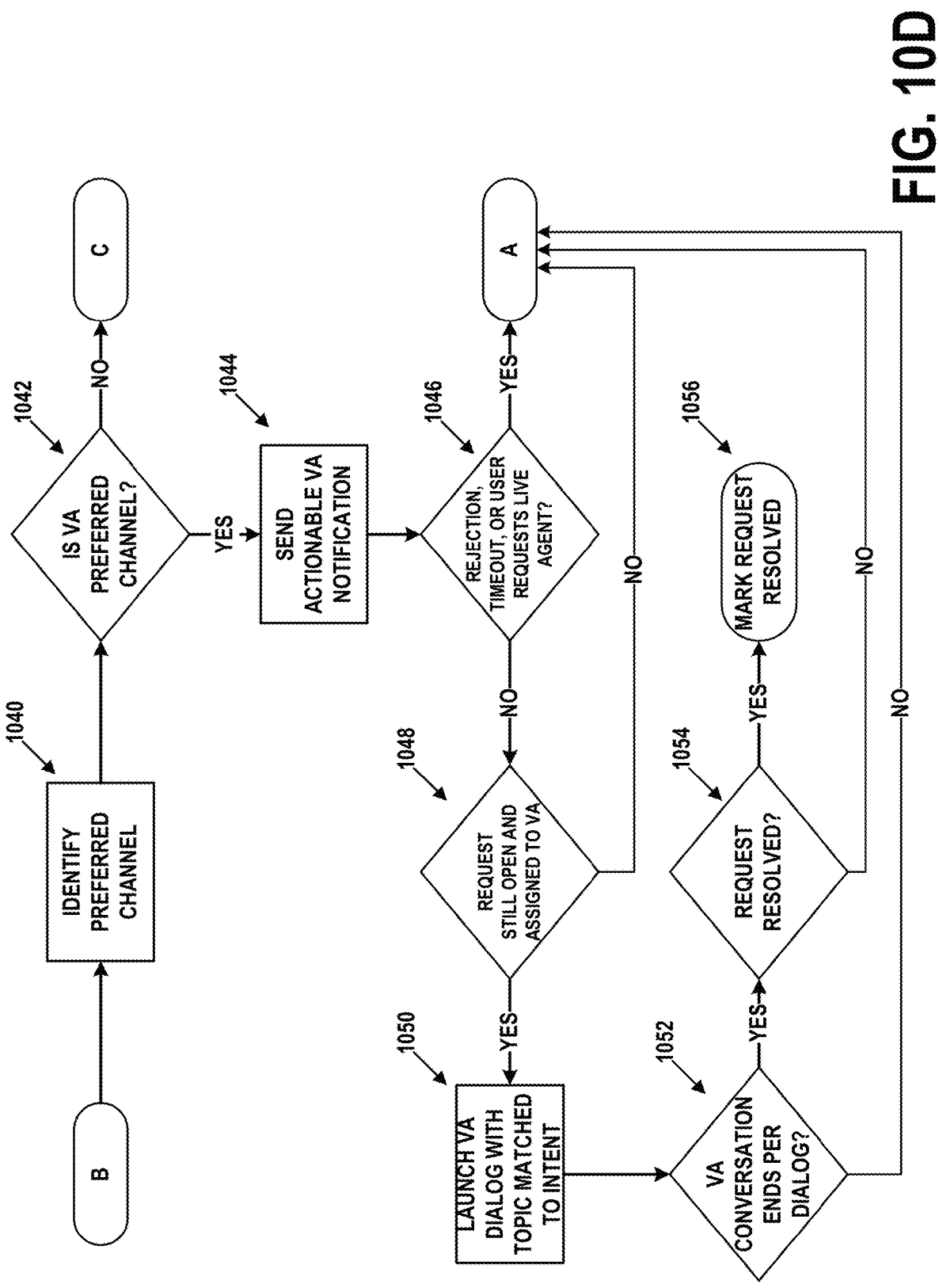

FIG. 10D depicts the routing request process for when a response to the request is to be communicated to the user to whom the request applies. At block 1040, the user's preferred channel is identified. This channel may have been pre-configured by the user or otherwise selected, and could include virtual agent, a third-party chat application, web interface, email, or text message for example. In some cases, the preferred channel may be the user's last-used channel.

At block 1042, it is determined whether this preferred channel is virtual agent. If so, control passes to block 1044. If not, control passes to block C. Block C involves communicating with the user by way of a non-virtual-agent channel, and is discussed in more detail below.

At block 1044, an actionable virtual agent notification is sent to the user by way of the virtual agent. The actionable notification may include text-based, image-based, audio-based, and/or video-based content that prompts the user to reply using one of a set of pre-determined options or in a free-form fashion.

At block 1046, it is determined whether the user has rejected the notification, the notification has timed out (e.g., after a pre-determined period of time such as 10 minutes), or the user has requested a live agent. If so, control passed to block A. If not, control passes to block 1048.

At block 1048, it is determined whether the request is still open and assigned to the virtual agent channel. This check is performed because there may be some time delay between blocks 1046 and 1048, which could result in the request being addressed by other means. If this condition is true, then control passes to block 1050. If it is not true, control passes to block A.

At block 1050, virtual agent dialog with the user is launched using the selected topic. This dialog may entail just one or two messages or could go on for several dozen messages or more over the course of several minutes or even several hours.

At block 1052, it is determined whether the conversation between the user and the virtual agent ends according to the dialog associated with the selected topic. In other words, did the conversation come to some form of resolution as defined by the dialog? If so, control passes to block 1054. If not, control passes to block A.

At block 1054 it is determined whether the request is resolved. A request may be considered resolved if that is indicated by the dialog state in which the conversation of block 1052 ended or if the user indicates that the request is resolved, for example. If so, control passes to block 1056. If not, control passes to block A.

At block 1056, the request is marked as resolved. For an incident, case, problem, or HR request, for example, this may involve closing the matter.

Figure 10E:

FIG. 10E depicts the request routing process for when the request is to be handled by a non-virtual-agent channel—the outcome of control passing to block C. At block 1060, an email or text message (SMS) notification is sent to the user, based on the user's preferred channel. The notification may include a link (e.g., a URL) to a way to obtain AI search results at a corresponding web portal. The notification may also include an embedded feedback mechanism with a tracking URL (e.g., a "thumbs up", "thumbs down", "like" or "dislike" icon or button).

Block 1062 represents the case where the user clicks on the AI search results link (doing so may open a web page with the results in the user's browser). Block 1064 represents the case where the user clicks on the feedback mechanism.

Regardless of what the user clicks on, at block 1066 it is determined whether the request can be resolved. For example, if the user clicked on the "thumbs up" or "like" icon or button (or otherwise indicates satisfaction with the results), the request may be considered to be resolved. Alternatively, the user may be explicitly asked whether the request has been resolved. If the request is deemed to be resolved, control passes to block 1056 (described above). If not, control passes to block A.

The embodiments illustrated in FIGS. 10A, 10B, 10C, 10D, and 10E may be carried out in accordance with variations of what is shown. Thus, blocks may be added, removed, replaced, or ordered differently. Other operations may also take place before, during, or after traversal of the request routing process. To that point, not shown in these figures, for sake of simplicity, are feedback mechanisms as well as service-level agreement (SLA) compliance mechanisms.

Feedback mechanisms may be implemented by way of any channel. When used, a feedback mechanism requests feedback from the user relating to their experience with the request routing process. The user's feedback may be binary in nature (e.g., good/bad) or on a scale (e.g., between 1 and 5 with increasing values representing more positive feedback).

SLA mechanisms may serve to implement an SLA policy. Such a policy might indicate, for example, that all requests of a certain severity must be addressed (e.g., resolved or closed) within a certain time frame. Thus, if a user does not respond to virtual agent, email, or text message within a timely manner that could risk violation of the SLA, the system transmits follow up/reminder messages by way of the user's preferred channel.

IX. Example Operations

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve obtaining a request from a plurality of requests.

Block 1102 may involve providing, to a criticality detection application and to an intent detection application, a representation of the request, wherein the criticality detection application is configured to detect a criticality of the request, and wherein the intent detection application is configured to determine a semantic intent of the request.

Block 1104 may involve receiving, from the criticality detection application and the intent detection application, respective indications of a detected criticality of the request and a detected intent of the request.

Block 1106 may involve, based at least on the detected criticality of the request, determining whether to route the request to a channel that is one of a live agent, a virtual agent, or a search-based application.

Block 1108 may involve routing the request to the channel as determined.

In some embodiments, determining whether to route the request to the channel comprises: determining that the detected criticality of the request is greater than a pre-determined threshold criticality; and in response to determining that the detected criticality of the request is greater than the pre-determined threshold criticality, routing the request to the live agent.

In some embodiments, the detected intent is associated with an intent confidence value, wherein determining whether to route the request to the channel comprises: determining that the detected criticality of the request is less than a pre-determined threshold criticality; in response to determining that the detected criticality of the request is less than the pre-determined threshold criticality, determining that the intent confidence value is less than a pre-determined intent threshold; and in response to determining that the intent confidence value is less than the pre-determined intent threshold, routing the request to the live agent.

In some embodiments, determining whether to route the request to the channel comprises: determining that the detected criticality of the request is less than a pre-determined threshold criticality; in response to determining that the detected criticality of the request is less than the pre-determined threshold criticality, determining that the detected intent matches a virtual agent topic supported by the virtual agent; and in response to determining that the detected intent matches the virtual agent topic supported by the virtual agent, routing the request to the virtual agent.

In some embodiments, determining whether to route the request to the channel comprises: determining that the detected criticality of the request is less than a pre-determined threshold criticality; in response to determining that the detected criticality of the request is less than the pre-determined threshold criticality, determining that the detected intent does not match any virtual agent topic supported by the virtual agent; and in response to determining that the detected intent does not match any virtual agent topic supported by the virtual agent, routing the request to the search-based application.

In some embodiments, routing the request to the search-based application comprises: determining a preferred search channel of a user associated with the request, wherein the preferred search channel is either a web portal, email, or text message; routing the request to the preferred search channel; and providing, to the user, search-based results related to the request by way of the preferred search channel.

In some embodiments, the request includes textual content, wherein the criticality detection application is configured to detect a criticality of the request based on presence or absence of a sensitive personal problem, an indication of a problem with a multi-user impact, or an indication of timeliness within the textual content.

In some embodiments, providing the representation of the request comprises: providing, to a pre-processor, the request; obtaining, from the pre-processor, a modified version of the request; and providing, to the criticality detection application and to the intent detection application, the modified version of the request.

In some embodiments, receiving the respective indications of the detected criticality of the request and the detected intent of the request comprises: receiving, from the criticality detection application and the intent detection application, respective initial indications of the detected criticality of the request and the detected intent of the request; providing, to a post-processor, one or more of the respective initial indications of the detected criticality of the request and the detected intent of the request; and obtaining, from the post-processor, modified versions of the one or more of the respective initial indications of the detected criticality of the request and the detected intent of the request.

In some embodiments, providing the representation of the request comprises also providing the representation of the request to a language detection application, wherein the language detection application is configured to detect a language in which the request is written. These embodiments may further involve receiving, from the language determine application, an indication of a detected language of the request, wherein determining whether to route the request to the channel is also based on the detected language.

In some embodiments, the request is initially assigned to a virtual agent queue for processing, wherein the request is removed from the virtual agent queue when it is routed to the live agent or the search-based application.

In some embodiments, the request is initially routed to the virtual agent. These embodiments may further involve: determining that a user associated with the request has rejected a recommendation from the virtual agent, requested the live agent, or has not replied to a query from the virtual agent within a pre-determined period of time; and re-routing the request to the live agent.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

obtaining a request;

determining a criticality and an intent of the request;

while the request is not assigned to an agent, selecting a channel from among a live agent, a virtual agent, and a search-based application, wherein the live agent is selected when the criticality of the request is greater than a threshold criticality, and wherein the virtual agent or the search-based application is selected based on the intent when the criticality of the request is not greater than the threshold criticality; and routing the request to the channel.

2. The method of claim 1, wherein a criticality detection application is configured to detect the criticality of the request, and wherein an intent detection application is configured to determine a semantic intent of the request.

3. The method of claim 2, wherein determining the criticality and the intent of the request comprises:

receiving, from the criticality detection application and the intent detection application, respective indications of a detected criticality of the request and a detected intent of the request.

4. The method of claim 2, wherein the request includes textual content, and wherein the criticality detection application is configured to detect the criticality of the request based on presence or absence of a sensitive personal problem, an indication of a problem with a multi-user impact, or an indication of timeliness within the textual content.

5. The method of claim 2, wherein determining the criticality and the intent of the request comprises:

receiving, from the criticality detection application and the intent detection application, respective initial indications of the criticality of the request and the intent of the request;

providing, to a post-processor, one or more of the respective initial indications of the criticality of the request and the intent of the request; and obtaining, from the post-processor, modified versions of the one or more of the respective initial indications of the criticality of the request and the intent of the request, wherein the criticality and the intent of the request are specified by the modified versions, respectively.

6. The method of claim 1, wherein selecting the channel from among the virtual agent or the search-based application comprises:

determining that the intent does not match any virtual agent topics supported by the virtual agent; and in response to determining that the intent does not match the virtual agent topics supported by the virtual agent, selecting the search-based application.

7. The method of claim 6, wherein selecting the search-based application comprises:

determining a preferred search channel of a user associated with the request, wherein the preferred search channel is either a web portal, email, or text message; and providing, to the user, search-based results related to the request by way of the preferred search channel.

8. The method of claim 1, wherein selecting the channel from among the virtual agent or the search-based application comprises:

determining that the intent matches a virtual agent topic supported by the virtual agent; and in response to determining that the intent matches the virtual agent topic supported by the virtual agent, selecting the virtual agent.

9. The method of claim 1, wherein determining the criticality and the intent of the request comprises:

providing, to a pre-processor, the request;

obtaining, from the pre-processor, a modified version of the request; and determining the criticality and the intent of the modified version of the request.

10. The method of claim 1, wherein selecting the channel from among the live agent, the virtual agent, and the search-based application comprises:

providing a representation of the request to a language detection application, wherein the language detection application is configured to detect a language in which the request is written;

receiving, from the language detection application, an indication of a detected language of the request; and selecting the channel also based on the detected language.

11. The method of claim 1, wherein the request is initially assigned to a virtual agent queue for processing, and wherein the request is removed from the virtual agent queue when it is routed to the live agent or the search-based application.

12. The method of claim 1, wherein the request is initially routed to the virtual agent, the method further comprising:

determining that a user associated with the request has rejected a recommendation from the virtual agent, requested the live agent, or has not replied to a query from the virtual agent within a pre-determined period of time; and re-routing the request to the live agent.

13. A non-transitory computer-readable medium, storing program instructions that, when executed by one or more processors of a computing system, cause the computing system to perform operations comprising:

obtaining a request;

determining a criticality and an intent of the request;

while the request is not assigned to an agent, selecting a channel from among a live agent, a virtual agent, and a search-based application, wherein the live agent is selected when the criticality of the request is greater than a threshold criticality, and wherein the virtual agent or the search-based application is selected based on the intent when the criticality of the request is not greater than the threshold criticality; and routing the request to the channel.

14. The non-transitory computer-readable medium of claim 13, wherein selecting the channel from among the virtual agent or the search-based application comprises:

determining that the intent does not match any virtual agent topics supported by the virtual agent; and in response to determining that the intent does not match the virtual agent topics supported by the virtual agent, selecting the search-based application.

15. The non-transitory computer-readable medium of claim 14, wherein selecting the search-based application comprises:

determining a preferred search channel of a user associated with the request, wherein the preferred search channel is either a web portal, email, or text message; and providing, to the user, search-based results related to the request by way of the preferred search channel.

16. The non-transitory computer-readable medium of claim 13, wherein selecting the channel from among the virtual agent or the search-based application comprises:

determining that the intent matches a virtual agent topic supported by the virtual agent; and in response to determining that the intent matches the virtual agent topic supported by the virtual agent, selecting the virtual agent.

17. The non-transitory computer-readable medium of claim 13, wherein determining the criticality and the intent of the request comprises:

providing, to a pre-processor, the request;

obtaining, from the pre-processor, a modified version of the request; and determining, the criticality and the intent of the modified version of the request.

18. The non-transitory computer-readable medium of claim 13, wherein selecting the channel from among the live agent, the virtual agent, and the search-based application comprises:

providing a representation of the request to a language detection application, wherein the language detection application is configured to detect a language in which the request is written;

receiving from the language detection application, an indication of a detected language of the request; and selecting the channel also based on the detected language.

19. The non-transitory computer-readable medium of claim 13, wherein the request is initially assigned to a virtual agent queue for processing, and wherein the request is removed from the virtual agent queue when it is routed to the live agent or the search-based application.

20. A method comprising:

obtaining a request;

determining a criticality and an intent of the request, wherein the intent is associated with an intent confidence value;

while the request is not assigned to an agent, selecting a channel from among a live agent, a virtual agent, and a search-based application, wherein the live agent is selected when the criticality of the request is greater than a threshold criticality or when the intent confidence value of the request is less than an intent threshold, and wherein the virtual agent or the search-based application is selected based on the intent when the criticality of the request is not greater than the threshold criticality and the intent confidence value of the request is not less than the intent threshold; and routing the request to the channel.

\* \* \* \* \*